US009277421B1

(12) United States Patent  
Petrovic et al.

(10) Patent No.: US 9,277,421 B1
(45) Date of Patent: Mar. 1, 2016

(54) SYSTEM AND METHOD FOR ESTIMATING NOISE IN A WIRELESS SIGNAL USING ORDER STATISTICS IN THE TIME DOMAIN

(71) Applicant: MARVELL INTERNATIONAL LTD., Hamilton (BM)

(72) Inventors: Vladan Petrovic, San Jose, CA (US); Christian R. Berger, San Jose, CA (US); Zhipei Chi, Sunnyvale, CA (US)

(73) Assignee: MARVELL INTERNATIONAL LTD. (BM)

( * ) Notice: Subject to any disclaimer, the term of this patent is extended or adjusted under 35 U.S.C. 154(b) by 0 days.

(21) Appl. No.: 14/558,770

(22) Filed: Dec. 3, 2014

Related U.S. Application Data

(60) Provisional application No. 61/911,291, filed on Dec. 3, 2013.

(51) Int. Cl.
H04B 15/00 (2006.01)
H04W 24/00 (2009.01)
H04W 52/22 (2009.01)

(52) U.S. Cl.
CPC ............. *H04W 24/00* (2013.01); *H04B 15/00* (2013.01); *H04W 52/225* (2013.01)

(58) Field of Classification Search
CPC ........ H04B 15/00; H04B 3/46; H04W 52/225
See application file for complete search history.

(56) References Cited

U.S. PATENT DOCUMENTS

| 5,550,872 A * | 8/1996 | Liberti, Jr. ............... H04L 1/02 375/267 |
| 2001/0010563 A1* | 8/2001 | Jun ........................ H04N 5/52 348/678 |
| 2002/0172269 A1* | 11/2002 | Xu ........................... H04L 1/02 375/211 |
| 2003/0025486 A1* | 2/2003 | Ellis ..................... G01K 11/006 324/76.14 |
| 2004/0002860 A1* | 1/2004 | Deisher ................. G10L 25/48 704/233 |
| 2006/0044171 A1* | 3/2006 | Noguchi ............. H03M 1/1255 341/155 |
| 2007/0016403 A1* | 1/2007 | Schuller ............... G10L 19/265 704/200.1 |
| 2007/0036239 A1* | 2/2007 | Ma ...................... H04L 25/0228 375/316 |
| 2007/0053416 A1* | 3/2007 | Li ........................ H04B 1/0003 375/147 |
| 2007/0111746 A1* | 5/2007 | Anderson ........... H04W 52/223 455/522 |
| 2009/0119096 A1* | 5/2009 | Gerl .................... G10L 21/0208 704/207 |
| 2009/0167308 A1* | 7/2009 | Lomes ................... G01V 3/081 324/326 |
| 2013/0090141 A1* | 4/2013 | Hottinen ............... H04B 15/00 455/501 |
| 2013/0121392 A1* | 5/2013 | Thompson ........ H04L 25/03159 375/227 |
| 2013/0142237 A1* | 6/2013 | Drooghaag ............. H04B 3/46 375/224 |
| 2014/0153625 A1* | 6/2014 | Vojcic ................... H04L 1/005 375/224 |

OTHER PUBLICATIONS

Professor P. Yageen Thomas, 2012 SERC Notes, Chapter 5 Order Statistics, Department of Statistics, University of Kerala, India (pp. 175-203).

* cited by examiner

Primary Examiner — Nay A Maung
Assistant Examiner — Cindy Trandai

(57) ABSTRACT

Systems, methods, and other embodiments associated with estimating noise in a receiver device based on related properties of order statistics are described. According to one embodiment, a method includes generating an initial set of magnitude squared values from a time domain impulse response of a receiver device. The method also includes generating an initial noise power estimate based on a modified set of magnitude squared values and generating a threshold value based on the initial noise power estimate. The method generates a final noise power estimate by averaging values of the initial set of magnitude squared values that are less than the threshold value and removing a thresholding bias from the resulting average.

20 Claims, 7 Drawing Sheets

SYSTEM AND METHOD FOR ESTIMATING NOISE IN A WIRELESS SIGNAL USING ORDER STATISTICS IN THE TIME DOMAIN

CROSS REFERENCE TO RELATED APPLICATIONS

This patent disclosure claims the benefit of U.S. Provisional Application Ser. No. 61/911,291 filed on Dec. 3, 2013, which is hereby wholly incorporated by reference.

BACKGROUND

Receiver devices, by their nature, have internal noise due to, for example, thermal energy within the receiver device. Furthermore, other internal or external sources of noise can be introduced into a receiver device. Alone or in combination, the internal noise and the external noise can interfere with receiving signals from a remote transmitter device. The ability to properly receive a transmitted signal can depend, to a large extent, on how the receiver noise is handled upon reception. Furthermore, signal reception can sometimes be improved by tailoring the transmitted signal to be received based on prior knowledge of characteristics of the receiver noise.

Therefore, some techniques perform noise estimation in receiver devices to obtain knowledge about the receiver noise. Many types of noise estimation techniques exist today. However, these noise estimation techniques have their limitations.

SUMMARY

In general, in one aspect this specification discloses a receiver device. In one embodiment, the receiver device includes radio frequency logic configured to receive radio frequency signals and to identify a training signal from the radio frequency signals. The receiver device further includes impulse response logic configured to generate a set of sample values. The set of sample values represent an impulse response of a system which includes the receiver device based on, at least in part, the training signal. The receiver device also includes noise estimation logic configured to generate a noise power estimate. When generating the noise power estimate, the noise estimation logic generates an initial set of magnitude squared values from the set of sample values. A mean value of the initial set of magnitude squared values is calculated. Furthermore, a modified set of magnitude squared values is generated from the initial set of magnitude squared values. The modified set of magnitude squared values is generated by eliminating magnitude squared values from the initial set of magnitude squared values based on the mean value. An initial noise power estimate is generated based on the modified set of magnitude squared values, and a threshold value is generated based on the initial noise power estimate. Values of the initial set of magnitude squared values that are less than the threshold value are averaged to generate a biased noise power estimate. A thresholding bias is removed from the biased noise power estimate to generate a final noise power estimate.

In general, in another aspect, this specification discloses a method. In one embodiment, the method includes generating a set of sample values representing an impulse response of a receiver device based on, at least in part, a training signal received by the receiver device. The method also includes generating an initial set of magnitude squared values from the set of sample values and calculating a mean value of the initial set of magnitude squared values. The method further includes generating a modified set of magnitude squared values from the initial set of magnitude squared values. The modified set of magnitude square values is generated by eliminating magnitude squared values from the initial set of magnitude squared values based on the mean value. The method also includes generating an initial noise power estimate based on the modified set of magnitude squared values, and generating a threshold value based on the initial noise power estimate. The method further includes generating a final noise power estimate. The final noise power estimate is generated by averaging values of the initial set of magnitude squared values that are less than the threshold value to generate a biased noise power estimate, and removing a thresholding bias from the biased noise power estimate.

In general, in another aspect, this specification discloses an integrated circuit device. In one embodiment, the integrated circuit device includes noise estimation logic. The noise estimation logic is configured to generate an initial set of magnitude squared values from an input set of sample values, representing an impulse response of a receiver device, and calculate a mean value of the initial set of magnitude squared values. The noise estimation logic is also configured to generate a modified set of magnitude squared values from the initial set of magnitude squared values by eliminating magnitude squared values from the initial set of magnitude squared values based on the mean value. The noise estimation logic is further configured to generate an initial noise power estimate based on the modified set of magnitude squared values, and generate a threshold value based on the initial noise power estimate. The noise estimation logic is also configured to average values of the initial set of magnitude squared values that are less than the threshold value to generate a biased noise power estimate. The noise estimation logic is further configured to remove a thresholding bias from the biased noise power estimate to generate a final noise power estimate.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of another element may be implemented as an external component and vice versa.

DETAILED DESCRIPTION

Disclosed herein are examples of systems, methods, and other embodiments associated with estimating noise in a receiver device based on properties of order statistics. Order statistics are statistical properties of an ordered set of random variables. In one embodiment, the present system and method are configured to use order statistics for noise power estimation by relating the properties of order statistics to the noise power.

In statistics, the $k^{th}$ order statistic of a statistical sample is equal to its $k^{th}$ smallest value (e.g., $1^{st}$ order statistic is minimum, $N^{th}$ order statistic is maximum of N samples). Finding k smallest receiver channel impulse response magnitude squared values ($m_{(i)}$, i=1, 2, ..., k or $m_{(1:k)}$ in short) can be useful in distinguishing between channel (signal) and noise samples in the time domain. For example, in the additive white Gaussian noise (AWGN) case, noise sample magnitude squared is exponentially distributed with parameter $1/\sigma^2$ (where σ is variance), and closed form expressions relating order statistics properties and noise power can be derived.

One embodiment of a system and method is disclosed herein that implements the relationship between properties of receiver noise and properties of order statistics, for accurately and efficiently generating a noise power estimate for a receiver device. The method starts by generating a set of time domain impulse response sample values representing an impulse response of a receiver device based on, at least in part, a training signal received by the receiver. Magnitude squared values (MSV) are generated from the set of time domain impulse response sample values and subsequently processed, taking into account order statistics properties, to arrive at an estimate for receiver noise power.

Figure 1:
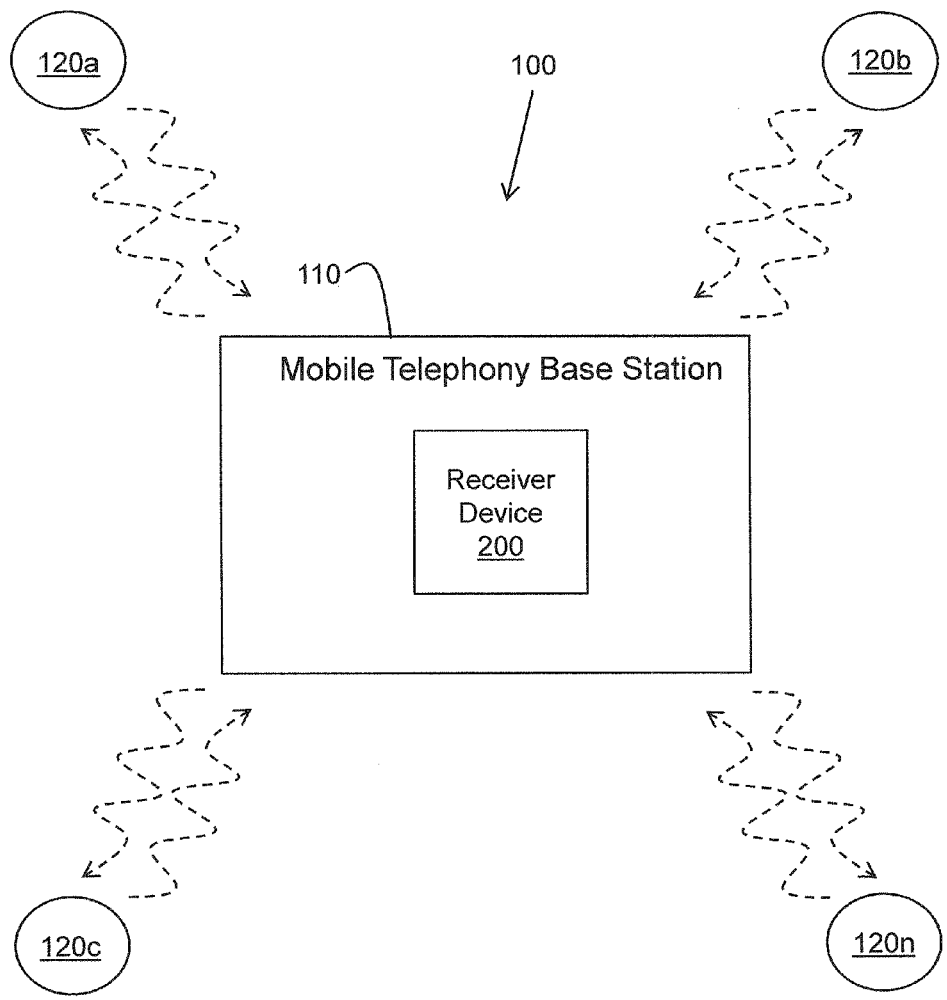
FIG. 1 illustrates one embodiment of a system associated with a receiver device.

FIG. 1 illustrates one embodiment of a system 100 associated with a receiver device. The system 100 includes a mobile telephony base station 110 that is configured to communicate with one or more remote wireless stations 120a-n. The remote wireless stations 120a-n may be fixed site communication stations and/or mobile stations such as, for example, mobile telephones. The mobile telephony base station 110 is configured to handle multiple mobile telephone calls by providing communication connections between mobile telephones and the wider telephone network. In this respect, the mobile telephony base station 110 constitutes a cell site in a cellular telephone network.

The mobile telephony base station 110 includes at least a receiver device 200. The mobile telephony base station 110 may also include other components to operate and communicate with wireless signals, for example, a transmitter, memory, processor, and so on. In the embodiment of FIG. 1, the receiver device 200 is configured to receive and identify wireless telephone signals (radio frequency signals) from the remote wireless stations 120a-n. The receiver device 200 is also configured to receive and identify radio frequency training signals from at least one of the remote wireless stations 120a-n. For example, in one embodiment, a fixed wireless station 120a is configured to transmit a radio frequency training signal to the receiver device 200. The receiver device 200 is configured to receive wireless signals, identify the training signal from other wireless signals, and use the received training signal to characterize one or more aspects (e.g., receiver noise) of the receiver device, as is explained in more detail later herein. In one embodiment, the training signal is a coded signal (e.g., a signal that is coded with a pseudo-random sequence).

In other embodiments, the receiver device 200 may be part of some other type of communication system. Such other types of communication systems may include, for example, a police radio communication system, a maritime communication system, a military communication system, and so on. In each different type of communication system, the receiver device 200 may be configured to operate in a particular environment that employs particular radio frequencies and modulation schemes. However, in each type of communication system in which the receiver device 200 may be employed, the receiver device 200 is configured to estimate receiver noise by implementing the relationship between properties of receiver noise and properties of order statistics.

Figure 2:
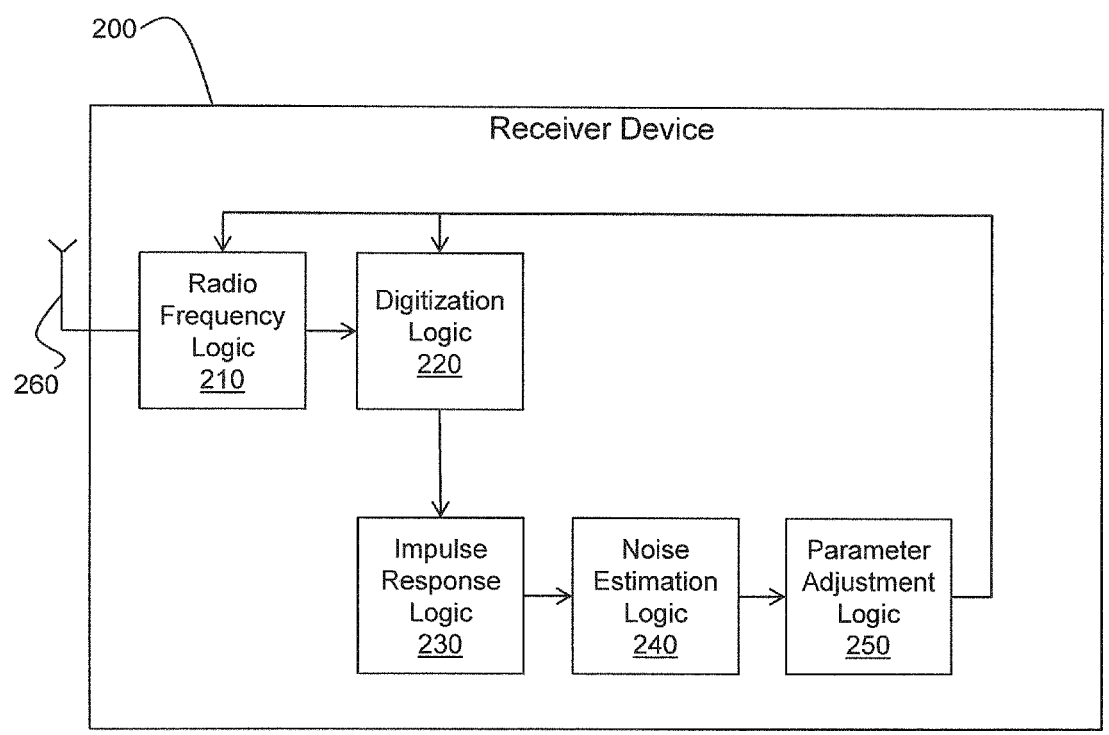
FIG. 2 illustrates a portion of the embodiment of FIG. 1, showing one example embodiment of a receiver device configured to perform noise estimation.

FIG. 2 illustrates a portion of the embodiment of FIG. 1, showing one example embodiment of the receiver device 200 configured to perform noise estimation. The receiver device 200 includes radio frequency logic 210, digitization logic 220, impulse response logic 230, noise estimation logic 240, and parameter adjustment logic 250. In one embodiment, the receiver device 200 is implemented on a chip (i.e., a system-on-chip or SOC configuration) including one or more integrated circuits configured to perform one or more functions described herein. In another embodiment, the receiver device 200 may be combined with a transmitter device (e.g. a transceiver device).

In another embodiment, the receiver device 200 is implemented on several chips that are interconnected via, for example, traces on a printed circuit board (PCB). In certain embodiments, the receiver device 200 may be configured to also include discrete components such as, for example, an antenna 260 and other discrete components (e.g., resistors, capacitors, inductors, transistors). In another embodiment, at least some portions of the logics of the receiver device 200 may be part of an executable algorithm, configured to perform the functions of the logics, where the algorithm is stored in a non-transitory medium.

Referring to FIG. 2, the radio frequency logic 210 is operably connected to the digitization logic 220. The radio frequency logic 210 is the "front end" of the receiver device 200 and is largely an analog logic. In one embodiment, the radio frequency logic 210 is configured to receive a radio frequency signal via the antenna 260, filter the received signal, amplify the received signal, and down-convert the received signal. The digitization logic 220 is configured to convert the received signal from an analog signal to a digital signal and demodulate the received signal.

The digitization logic 220 is operably connected to the impulse response logic 230. When the received signal is a coded training signal, the impulse response logic 230 is configured to generate a set of time domain impulse response sample values, based on the digitized and demodulated training signal, representing the impulse response of the receiver device 200. In general, the impulse response characterizes the reaction or response of a system (e.g., transmitter, communication medium, and receiver) as a function of time when excited with an impulse signal.

For example, in one embodiment, the impulse response logic 230 is configured to de-convolve the received training signal with the known training sequence of the training signal in the time domain. Alternatively, in another embodiment, the impulse response logic 230 is configured to multiply a Discrete Fourier Transform (DFT) of the received training signal by the inverse of the known training sequence in the frequency domain, and transform the result back to the time domain using an Inverse Discrete Fourier Transform (IDFT). In either embodiment, the resulting impulse response signal h(n) includes channel (signal) impulse response and noise samples (where n=0, 1, ..., N−1) which are the set of time domain impulse response sample values.

The impulse response logic 230 is operably connected to the noise estimation logic 240. In accordance with one embodiment, a magnitude squared signal, m(n), having magnitude squares values (MSV) derived from the impulse response signal, h(n), can be used for noise power estimation. The magnitude squared signal can be represented as m(n)=|h(n)|$^2$, where n=0, 1, ..., N−1. For example, if h(n)=(2, 3, −2, 5, 1), then m(n)=(4, 9, 4, 25, 1).

In one embodiment, the noise estimation logic 240 is configured to generate an initial set of magnitude squared values, m(n), from the set of time domain impulse response sample values, h(n). The noise estimation logic 240 is also configured to calculate a mean value of the initial set of magnitude squared values, m(n), as follows:

$$\overline{m}_S = \frac{1}{|S|} \sum_{n \in S} m(n)$$

where S is the set of indices for all samples in the impulse response signal, h(n), (i.e., S={0, 1, ..., N−1}) and |S| is the size of the set (i.e., the number of samples (N)).

The noise estimation logic 240 is also configured to generate a modified set of magnitude squared values, m(n)$_{modified}$, with modified set of indices S', from the initial set of magnitude squared values, m(n). The modified set of magnitude squared values, m(n)$_{modified}$, is generated by eliminating magnitude squared values (MSV) from the initial set of MSV, m(n), that are greater than the mean value (i.e., set S' is the set of indices of m(n) samples having values less than the mean value).

In accordance with one embodiment, the noise estimation logic 240 is configured to iterate between calculating a mean value and generating a modified set of MSV until a number of MSV in the modified set of MSV is less than a predetermined fraction or percentage (e.g., 0.75 or 75%) of the number of MSV in the initial set of MSV. For example, if the number of MSV in the initial set of MSV is 100, the noise estimation logic 240 may iterate between calculating a mean value for a current set of MSV and generating a modified set of MSV until a number of MSV in the modified set of MSV is less than 75. The predetermined fraction or percentage may be determined experimentally, for example, in accordance with one embodiment.

Once a modified set of MSV, m(n)$_{modified}$, is settled upon, the noise estimation logic 240 is configured to generate an initial noise power estimate, $\sigma^2_{init}$, based on the modified set of MSV, m(n)$_{modified}$. For example, in one embodiment, the initial noise power estimate, $\sigma^2_{init}$, is generated by calculating a weighted average of the modified set of MSV, m(n)$_{modified}$, as follows:

$$\hat{\sigma}^2_{init} = \frac{1}{|S'|} \left( \sum_{n \in S'} m(n) + (N - |S'|) \overline{m}_S \right)$$

where N is the original number of sample values in the impulse response signal, h(n), and |S'| is the number of MSV in the resultant modified set of MSV. It is noted here that |S'|=k, where k is the number of smallest receiver channel impulse response magnitude squared values (m$_{(i)}$, i=1, 2, ..., k or m$_{(1:k)}$ in short) that are useful in distinguishing between channel (signal) and noise samples in the time domain, in accordance with order statistics.

The noise estimation logic 240 is configured to generate a threshold value, T, based on the initial noise power estimate, $\sigma^2_{init}$. For example, in one embodiment, the threshold value, T, is generated by scaling the initial noise power estimate, $\sigma^2_{init}$, by a predetermined scaling value, α, as follows:

T=α$\sigma^2_{init}$

The predetermined scaling value, a, may be determined experimentally, for example, in accordance with one embodiment.

The noise estimation logic 240 is configured to average the values of the initial set of MSV, m(n), that are less than the threshold value to generate a biased noise power estimate as follows:

$$\hat{\sigma}^2(\text{biased}) = \frac{1}{|S|} \sum_{n \in S} m(n), S = \{n \in \{0, 1, \ldots, N-1\} : m(n) < \alpha \hat{\sigma}^2_{init}\}$$

The noise estimation logic 240 is further configured to remove the thresholding bias (due to applying the threshold, T) from the biased noise power estimate to generate a final noise power estimate, $\sigma^2$, as follows:

$$\hat{\sigma}^2 = \frac{1}{1 - (\alpha + 1)e^{-\alpha}} \hat{\sigma}^2(\text{biased})$$

As seen in the equation for the final noise power estimate, $\sigma^2$, immediately above, the thresholding bias is removed by scaling the biased noise power estimate by a predetermined scaling value which is a function of a. In this manner, order statistics may be used for noise power estimation since the properties of order statistics can be related to the noise power. The functions that may be performed by the logics of the receiver device 200, as described above herein, may be performed efficiently (due to computational simplicity) to result in an accurate estimation of receiver noise power.

Once the final noise power estimate, $\sigma^2$, has been generated, the final noise power estimate may be used to adjust one or more parameters (e.g., a receiver equalizer coefficient, a receiver gain, a receiver bandwidth, a tuned frequency) of the receiver device 200. The noise estimation logic 240 is operably connected to the parameter adjustment logic 250. Furthermore, the parameter adjustment logic 250 is operably connected to one or more of the radio frequency logic 210 and the digitization logic 220.

In one embodiment, the parameter adjustment logic 250 is configured to adjust at least one parameter of the receiver device 200 based on the final noise power estimate. For example, referring to FIG. 2, the final noise power estimate, $\sigma^2$, may be output from the noise estimation logic 240 and input to the parameter adjustment logic 250. The parameter adjustment logic 250 may generate one or more feedback values that are communicated to one or more of the radio frequency logic 210 and the digitization logic 220.

In accordance with one embodiment, the parameter adjustment logic 250 generates a receiver gain feedback value, based on the noise power estimate, which is communicated to the radio frequency logic 210 such that the gain of a low noise amplifier within the radio frequency logic 210 is adjusted. In accordance with another embodiment, the parameter adjustment logic 250 generates a receiver bandwidth feedback value, based on the noise power estimate, which is communicated to the radio frequency logic 210 such that a bandwidth of a receiver filter within the radio frequency logic 210 is adjusted. Estimated noise power may also be used for receiver equalizer training, in accordance with one embodiment. Other feedback values for adjusting other receiver parameters may be generated by the parameter adjustment logic as well, based on the noise power estimate, $\sigma^2$, in accordance with other embodiments.

Figure 3:
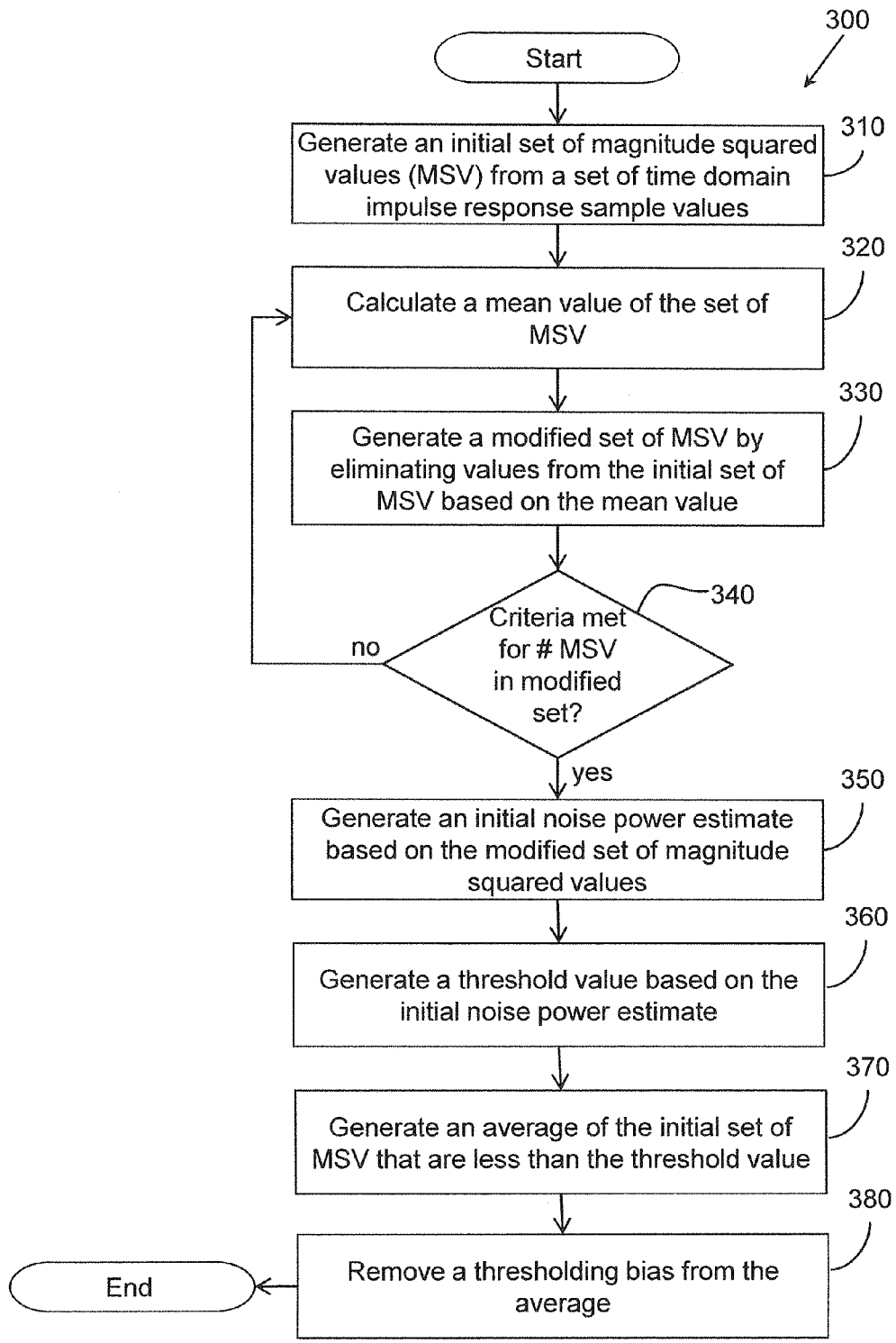
FIG. 3 illustrates one example embodiment of a method for generating a noise power estimate in the receiver device of FIG. 2.

FIG. 3 illustrates one example embodiment of a method 300 for generating a noise power estimate in the receiver device 200 of FIG. 2. Method 300 is implemented to be performed by the receiver device 200 of FIG. 2, or by a computing device (e.g., an integrated circuit device) configured with an algorithm of method 300. Method 300 will be described from the perspective that relating noise power to order statistics allows method 300 to generate an accurate noise power estimate in a computationally efficient manner.

Figure 4:
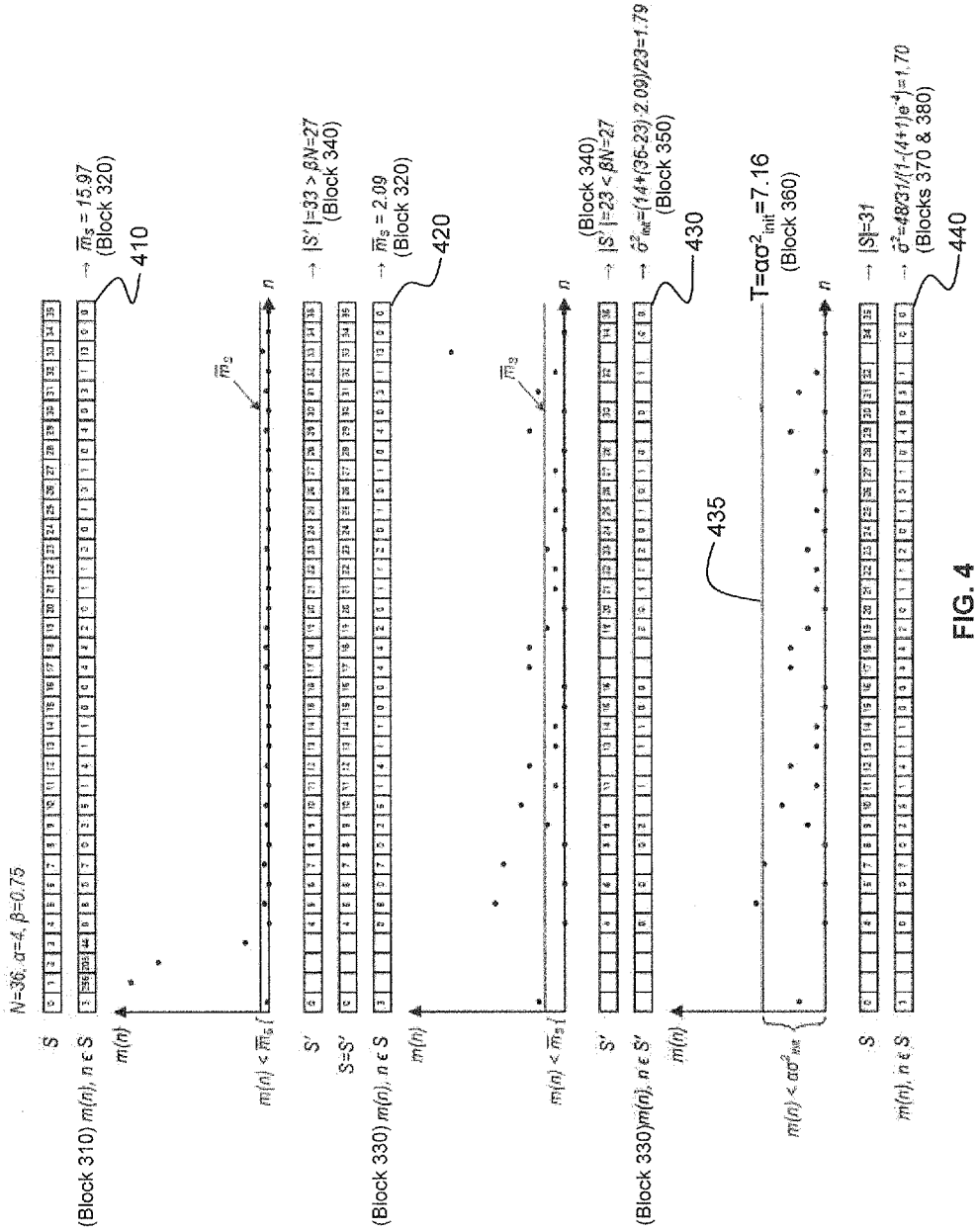
FIG. 4 illustrates an example embodiment of performing the method of FIG. 3 to generate a noise power estimate from a set of time domain impulse response sample values.

In accordance with one embodiment, method 300 is performed by the noise estimation logic 240 of the receiver device 200. FIG. 4 illustrates an example embodiment of performing the method 300 of FIG. 3 to generate a noise power estimate from a set of time domain impulse response sample values. Method 300 will be described herein from the perspective of the example of FIG. 4.

Upon initiating method 300, at 310, an initial set of magnitude squared values (MSV), m(n), is generated from a set of time domain impulse response sample values. Referring to FIG. 4, there are thirty-six (36) MSV in the initial set of MSV 410 which are generated by squaring each of thirty-six (36) values in a set of time domain impulse response samples representing an impulse response of the receiver device 200. The thirty-six (36) MSV in the initial set of MSV 410 are as follows:

m(n)={3, 256, 206, 44, 0, 8, 0, 7, 0, 2, 5, 1, 4, 1, 1, 0, 0, 4, 4, 2, 0, 1, 1, 2, 0, 1, 0, 1, 0, 4, 0, 3, 1, 13, 0, 0}.

At 320, a mean value of the initial set of MSV 410, m(n), is calculated using the equation for calculating a mean value given previously herein. Referring to FIG. 4, the mean value is calculated to be a value of 15.97. At 330, a modified set of MSV 420 are generated from the initial set of MSV by eliminating MSV from the initial set of MSV that are greater than the mean value. Referring to FIG. 4, the modified set of MSV 420 results when the mean value of 15.97 is applied as a threshold to the initial set of MSV 410 as follows:

m(n)$_{modified}$={3, -, -, -, 0, 8, 0, 7, 0, 2, 5, 1, 4, 1, 1, 0, 0, 4, 4, 2, 0, 1, 1, 2, 0, 1, 0, 1, 0, 4, 0, 3, 1, 13, 0, 0}.

As can be seen, three MSV have been eliminated by applying the mean value of 15.97 as a threshold. This leaves thirty-three (33) MSV in the modified set of MSV 420.

At 340, a check is performed to see if the modified set of MSV meets a criterion. If the criterion is not met at 340, then the method reverts back to 320. Otherwise, the method proceeds to 350. In accordance with one embodiment, for 340, the criterion is met when a number of MSV in the modified set of MSV is less than a predetermined fraction, $\beta$, of the number of MSV in the initial set of MSV. Referring to FIG. 4, the predetermined fraction is 0.75 (or 75%) resulting in the criterion being met when the number of MSV in the modified set of MSV is less than twenty-seven (27). However, as discussed previously, there are thirty-three (33) MSV in the modified set of MSV 420. Therefore, the criterion is not met and the method reverts back to 320. In one embodiment, iteration between 320 and 340 keeps occurring until the criterion is met at 340.

Upon reverting back to 320, a new mean value is calculated where, this time, the mean value is calculated based on the MSV in the modified set of MSV 420. Referring to FIG. 4, the new mean value is 2.09 and, when applied as a threshold to the modified set of MSV 420, results in a new modified set of MSV 430 at 330 as follows:

m(n)$_{new\ modified}$={-, -, -, -, 0, -, 0, -, 0, 2, -, 1, -, 1, 1, 0, 0, -, 2, 0, 1, 1, 2, 0, 1, 0, 1, 0, -, 0, -, 1, -, 0, 0}.

As can be seen, ten (10) more MSV have been eliminated by applying the mean value of 2.09 as a threshold. This leaves twenty-three (23) MSV in the new modified set of MSV 430 which is less than twenty-seven (27). Therefore, the criterion at 340 has been met.

Once the criterion at 340 is met then, at 350, an initial noise power estimate is generated based on the modified set of MSV that meets the criterion at 340. Referring to FIG. 4, the initial noise power estimate, $\sigma^2_{init}$, is calculated to be a value of 1.79, using the equation for initial noise power estimate as given previously herein. At 360, a threshold value 435 (T) is generated based on the initial noise power estimate. Referring to FIG. 4, the threshold value 435 (where T=7.16) is based on applying a scaling factor of $\alpha$=4 to the initial noise power estimate.

At 370, the threshold value 435 (where T=7.16) is applied to the initial set of MSV 410 to remove any MSV that are above the threshold value, T. The resultant reduced set of MSV 440 is as follows:

m(n)$_{reduced}$={3, -, -, -, 0, -, 0, 7, 0, 2, 5, 1, 4, 1, 1, 0, 0, 4, 4, 2, 0, 1, 1, 2, 0, 1, 0, 1, 0, 4, 0, 3, 1, -, 0, 0}, having a total of thirty-one (31) values remaining (i.e., five MSV removed).

Furthermore, at 370, an average of the initial set of MSV that are less than the threshold value 435 (i.e., m(n)$_{reduced}$ 440) is generated using the equation previously given above herein. The average is a biased noise power estimate, where the bias is a thresholding bias that is introduced when the threshold value 435, T, is applied.

At 380, a final noise power estimate is generated by removing a thresholding bias from the biased noise power estimate. The thresholding bias is removed by applying a scaling factor to the biased noise power estimate which is a function of the scaling factor $\alpha$ (where $\alpha$=4 in this example). The function of the scaling factor $\alpha$, f($\alpha$), is as follows:

$$f(\alpha) = \frac{1}{1 - (\alpha + 1)e^{-\alpha}}$$

The resulting final noise power estimate, $\sigma^2$, is a value of 1.70 as seen in FIG. 4. In this manner, in accordance with one embodiment, the noise power estimate, $\sigma^2$, may be provided to the parameter adjustment logic 250 as described previously herein such that one or more receiver parameters may be adjusted to optimize receiver performance. However, receiver noise can change over time due to various factors and conditions. Therefore, in accordance with one embodiment, estimates of receiver noise power may be performed regularly or periodically. In this manner, optimum receiver performance can be maintained over time.

Embodiments disclosed herein generate and implement a relationship between properties of receiver noise and properties of order statistics, for accurately and efficiently generating a noise power estimate for a receiver device. Initially, a set of time domain impulse response sample values are generated representing an impulse response of a receiver device based on, at least in part, a training signal received by the receiver.

Magnitude squared values (MSV) are generated from the set of time domain impulse response sample values and subsequently processed, taking into account order statistics properties, to arrive at an estimate for receiver noise power.

Integrated Circuit Device Embodiments

Figure 5:
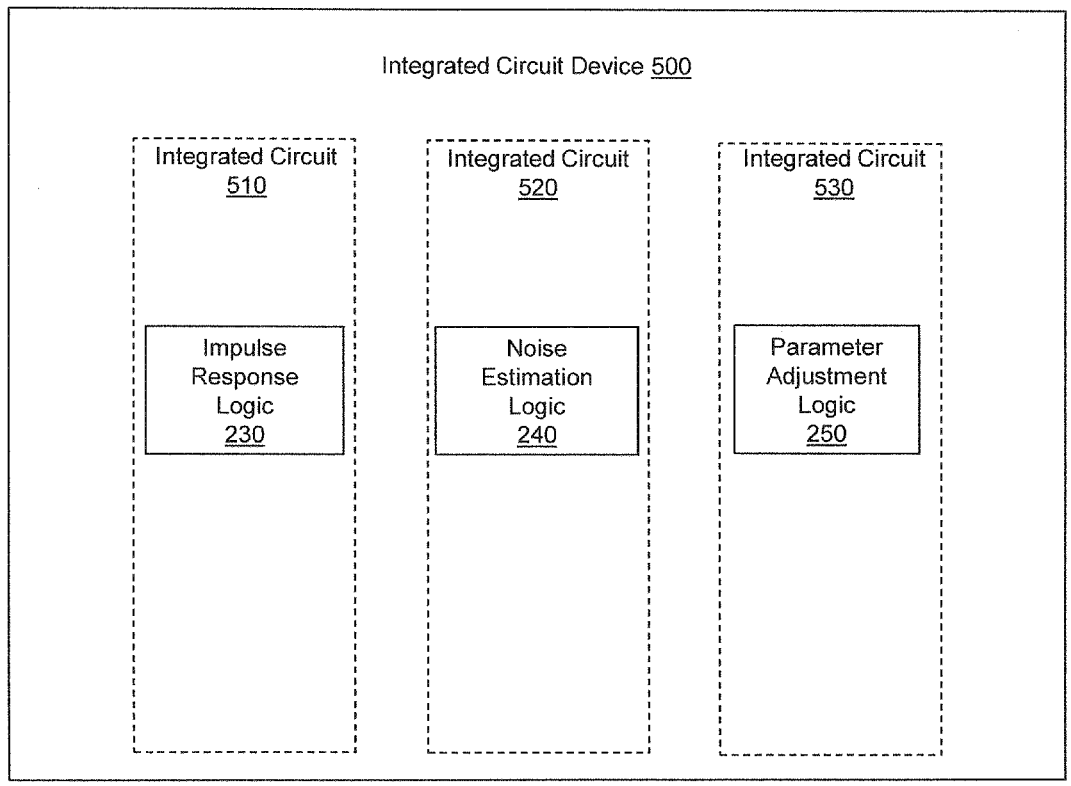
FIG. 5 illustrates one embodiment of a portion of the receiver device of FIG. 2 implemented as an integrated circuit device.

In one embodiment, the receiver device 200 may be on one or more integrated circuit chips. FIG. 5 illustrates one embodiment of a portion of the receiver device 200 of FIG. 2 implemented as an integrated circuit device 500 for providing a time domain receiver noise power estimate based on order statistics. In this embodiment, the impulse response logic 230 is embodied as a separate integrated circuit 510. Additionally, the noise estimation logic 240 is embodied on an individual integrated circuit 520. The parameter adjustment logic 250 is also embodied on an individual integrated circuit 530.

The circuits are connected via connection paths to communicate signals. While integrated circuits 510, 520, and 530 are illustrated as separate integrated circuits, they may be integrated into a common integrated circuit device 500. Additionally, integrated circuits 510, 520, and 530 may be combined into fewer integrated circuits or divided into more integrated circuits than illustrated.

In another embodiment, the impulse response logic 230, the noise estimation logic 240, and the parameter adjustment logic 250 (which are illustrated in integrated circuits 510, 520, and 530, respectively) may be combined into a separate application-specific integrated circuit. In other embodiments, portions of the functionality associated with the impulse response logic 230, the noise estimation logic 240, and the parameter adjustment logic 250 may be embodied as firmware executable by a processor and stored in a non-transitory memory (e.g., a non-transitory computer storage medium).

Figure 6:
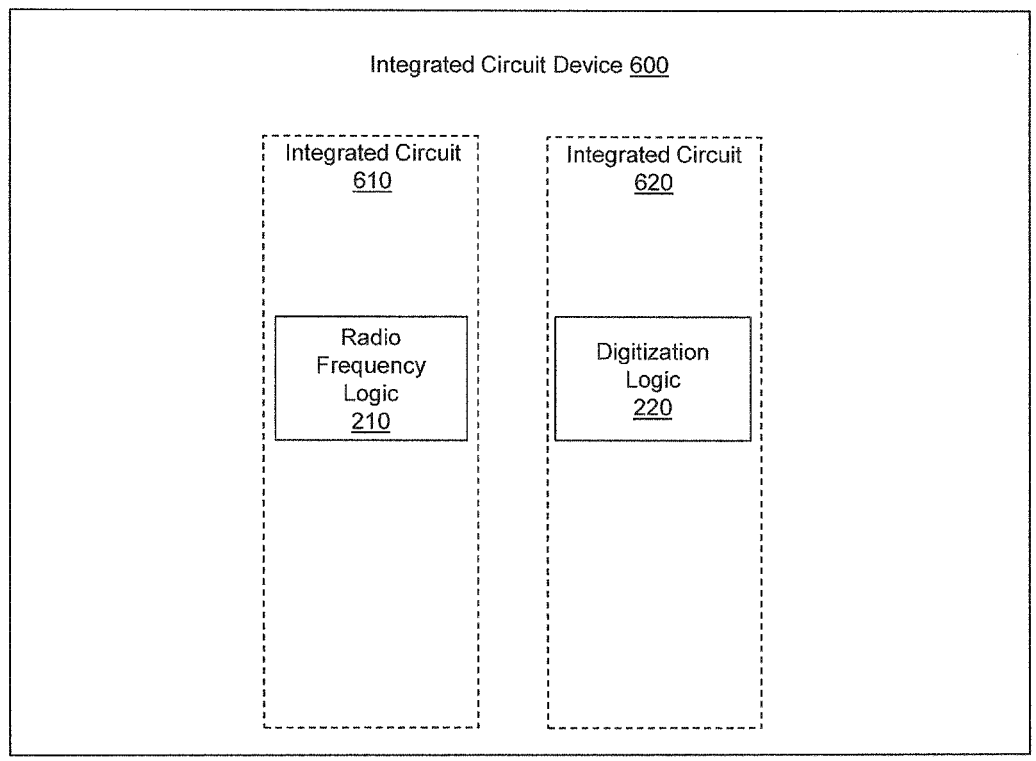
FIG. 6 illustrates one embodiment of another portion of the receiver device of FIG. 2 implemented as an integrated circuit device.

FIG. 6 illustrates one embodiment of another portion of the receiver device 200 of FIG. 2 implemented as an integrated circuit device 600 for providing a time domain receiver noise power estimate based on order statistics. In this embodiment, the radio frequency logic 210 is embodied as a separate integrated circuit 610. Additionally, the digitization logic 220 is embodied on an individual integrated circuit 620.

The circuits are connected via connection paths to communicate signals. While integrated circuits 610 and 620 are illustrated as separate integrated circuits, they may be integrated into a common integrated circuit device 600. Additionally, integrated circuits 610 and 620 may be combined into fewer integrated circuits or divided into more integrated circuits than illustrated.

In another embodiment, the radio frequency logic 210 and the digitization logic 220 (which are illustrated in integrated circuits 610 and 620, respectively) may be combined into a separate application-specific integrated circuit. In other embodiments, portions of the functionality associated with the radio frequency logic 210 and the digitization logic 220 may be embodied as firmware executable by a processor and stored in a non-transitory memory (e.g., a non-transitory computer storage medium).

Figure 7:
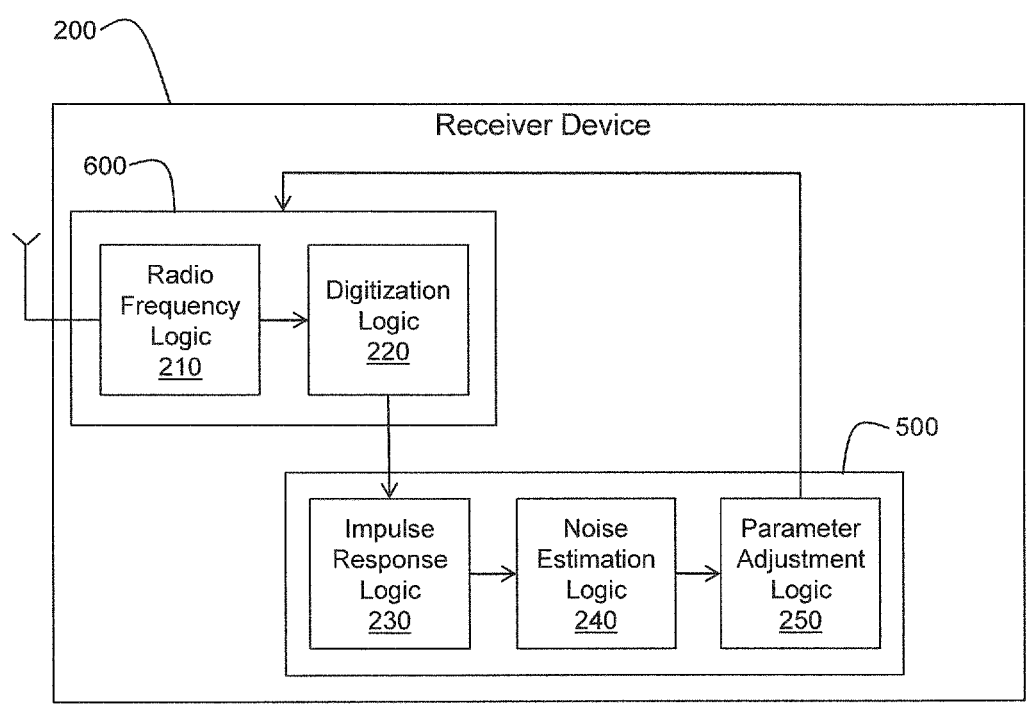
FIG. 7. Illustrates one embodiment of the receiver device of FIG. 2 implemented with the integrated circuit devices of FIG. 5 and FIG. 6.

In accordance with one embodiment, the integrated circuit device 500 and the integrated circuit device 600 are implemented in a single receiver device 200, as shown in FIG. 7, and are connected via connection paths to communicate signals. In another embodiment, the integrated circuits 510, 520, 530, 610, and 620 may be combined into a single integrated circuit device and are connected via connection paths to communicate signals.

DEFINITIONS AND OTHER EMBODIMENTS

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium" or "computer storage medium", as used herein, refers to a non-transitory medium that stores instructions and/or data configured to perform one or more of the disclosed functions when executed. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C §101.

"Logic", as used herein, represents a component that is implemented with computer or electrical hardware, firmware, a non-transitory medium with stored instructions of an executable application or program module, and/or combinations of these to perform any of the functions or actions as disclosed herein, and/or to cause a function or action from another logic, method, and/or system to be performed as disclosed herein. Logic may include a microprocessor programmed with an algorithm, a discrete logic (e.g., ASIC), at least one circuit, an analog circuit, a digital circuit, a programmed logic device, a memory device containing instructions of an algorithm, and so on, any of which are configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. Logic is limited to statutory subject matter under 35 U.S.C. §101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional actions that are not illustrated in blocks. The methods described herein are limited to statutory subject matter under 35 U.S.C §101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. §101.

What is claimed is:

1. A receiver device comprising:
   radio frequency logic configured to receive radio frequency signals and to identify a training signal from the radio frequency signals;
   impulse response logic configured to generate a set of sample values representing an impulse response of a system, wherein the system includes the receiver device and the set of sample values are generated based at least on the training signal; and
   noise estimation logic configured to generate a noise power estimate by:
   (i) generating an initial set of magnitude squared values from the set of sample values,
   (ii) calculating a mean value of the initial set of magnitude squared values,
   (iii) generating a modified set of magnitude squared values from the initial set of magnitude squared values by eliminating magnitude squared values from the initial set of magnitude squared values based on the mean value,
   (iv) generating an initial noise power estimate based on the modified set of magnitude squared values,
   (v) generating a threshold value based on the initial noise power estimate,
   (vi) averaging values of the initial set of magnitude squared values that are less than the threshold value to generate a biased noise power estimate, and
   (vii) removing a thresholding bias from the biased noise power estimate to generate a final noise power estimate.

2. The receiver device of claim 1, wherein the noise estimation logic is configured to iterate between:
   (i) calculating a mean value of a current set of magnitude squared values; and
   (ii) generating a modified set of magnitude squared values from the current set of magnitude squared values by eliminating magnitude squared values from the current set of magnitude squared values based on the mean value,
   until a number of magnitude squared values in the modified set of magnitude squared values is less than a predetermined fraction of the number of magnitude squared values in the initial set of magnitude squared values.

3. The receiver device of claim 1, further comprising parameter adjustment logic configured to adjust at least one receiver parameter of the receiver device based on the final noise power estimate.

4. The receiver device of claim 3, wherein the at least one receiver parameter comprises at least one of a receiver equalizer coefficient, a receiver gain, a receiver bandwidth, and a tuned frequency.

5. The receiver device of claim 1, wherein the training signal comprises a pseudo-random sequence.

6. The receiver device of claim 1, wherein the impulse response logic is configured to deconvolve the training signal based on a training sequence of the training signal.

7. The receiver device of claim 1, wherein the receiver device is a part of a mobile telephony base station.

8. The receiver device of claim 1, wherein the noise estimation logic is configured to generate the initial noise power estimate by calculating a weighted average of the modified set of magnitude squared values.

9. The receiver device of claim 1, wherein the noise estimation logic is configured to generate the threshold value by scaling the initial noise power estimate by a predetermined scaling value.

10. The receiver device of claim 1, wherein the noise estimation logic is configured to remove the thresholding bias by scaling the biased noise power estimate by a predetermined scaling value.

11. A method comprising:
    generating a set of sample values representing an impulse response of a receiver device based at least on a training signal received by the receiver device;
    generating an initial set of magnitude squared values from the set of sample values;
    calculating a mean value of the initial set of magnitude squared values;

generating a modified set of magnitude squared values from the initial set of magnitude squared values by eliminating magnitude squared values from the initial set of magnitude squared values based on the mean value;

generating an initial noise power estimate based on the modified set of magnitude squared values;

generating a threshold value based on the initial noise power estimate; and generating a final noise power estimate by:
averaging values of the initial set of magnitude squared values that are less than the threshold value to generate a biased noise power estimate, and
removing a thresholding bias from the biased noise power estimate.

12. The method of claim 11, further comprising adjusting at least one receiver parameter of the receiver device based on the final noise power estimate.

13. The method of claim 11, wherein generating the initial noise power estimate comprises calculating a weighted average of the modified set of magnitude squared values.

14. The method of claim 11, wherein generating the threshold value comprises scaling the initial noise power estimate by a predetermined scaling value.

15. The method of claim 11, wherein removing the thresholding bias comprises scaling the biased noise power estimate by a predetermined scaling value.

16. The method of claim 11, further comprising iterating between:
(i) calculating a mean value of a current set of magnitude squared values; and
(ii) generating a modified set of magnitude squared values from the current set of magnitude squared values by eliminating magnitude squared values from the current set of magnitude squared values based on the mean value,
until a number of magnitude squared values in the modified set of magnitude squared values is less than a predetermined fraction of the number of magnitude squared values in the initial set of magnitude squared values.

17. An integrated circuit device, comprising:
noise estimation logic configured to:
generate an initial set of magnitude squared values from an input set of sample values representing an impulse response of a receiver device;
calculate a mean value of the initial set of magnitude squared values;
generate a modified set of magnitude squared values from the initial set of magnitude squared values by eliminating magnitude squared values from the initial set of magnitude squared values based on the mean value;
generate an initial noise power estimate based on the modified set of magnitude squared values;
generate a threshold value based on the initial noise power estimate;
average values of the initial set of magnitude squared values that are less than the threshold value to generate a biased noise power estimate; and
remove a thresholding bias from the biased noise power estimate to generate a final noise power estimate.

18. The integrated circuit device of claim 17, wherein the noise estimation logic is configured to iterate between:
(i) calculating a mean value of a current set of magnitude squared values; and
(ii) generating a modified set of magnitude squared values from the current set of magnitude squared values by eliminating magnitude squared values from the current set of magnitude squared values based on the mean value,
until a number of magnitude squared values in the modified set of magnitude squared values is less than a predetermined fraction of the number of magnitude squared values in the initial set of magnitude squared values.

19. The integrated circuit device of claim 17, further comprising impulse response logic configured to generate the set of sample values representing an impulse response of a receiver device based at least on a received training signal.

20. The integrated circuit device of claim 17, further comprising parameter adjustment logic configured to generate at least one feedback value for adjusting at least one receiver parameter of a receiver device based on the final noise power estimate.

* * * * *